July 28, 1970          F. V. KENYON          3,522,107
ADJUSTABLE THERMOCOUPLE WITH ADAPTOR MEANS
Filed July 6, 1967
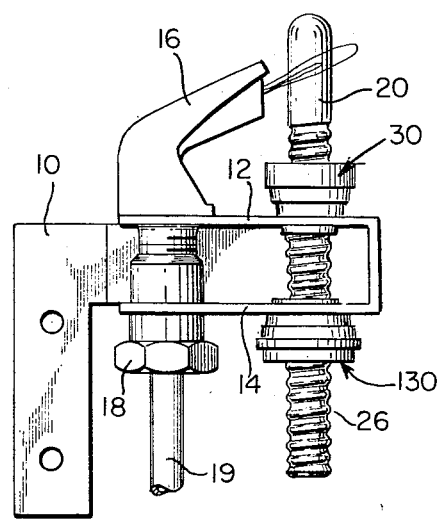
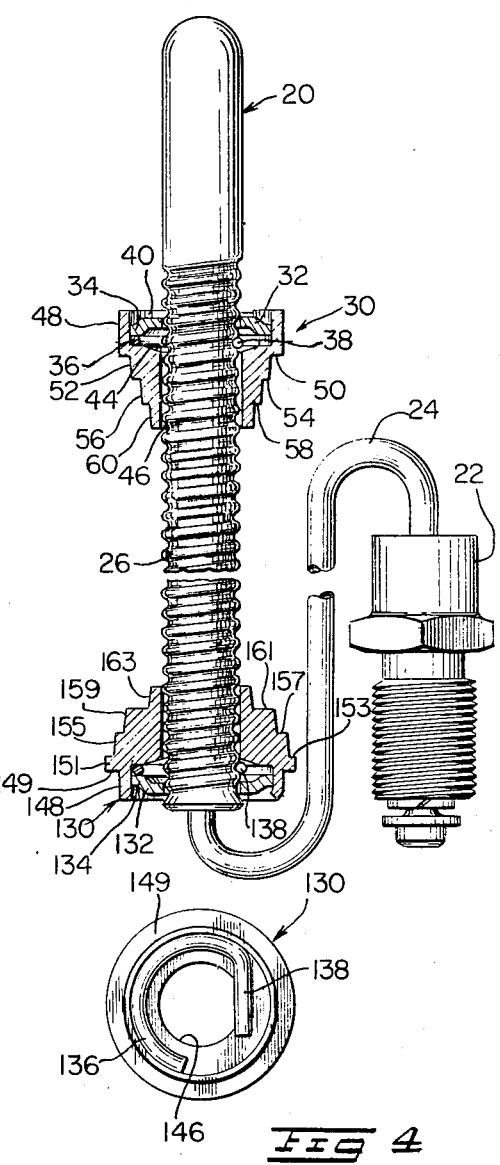
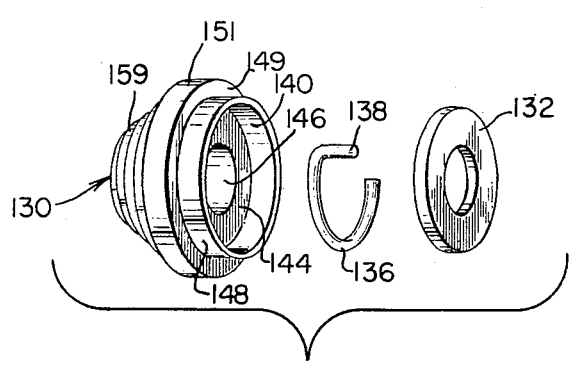
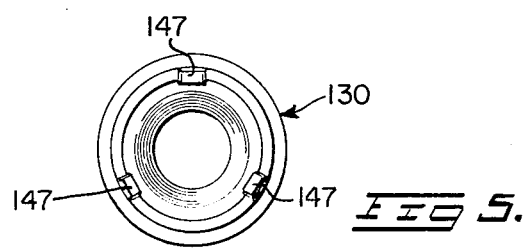
INVENTOR.
FRED V. KENYON
BY
*Christen, Sabol, O'Brien & Caldwell*
ATTORNEYS

United States Patent Office

3,522,107
Patented July 28, 1970

---

3,522,107
ADJUSTABLE THERMOCOUPLE WITH ADAPTOR MEANS
Fred V. Kenyon, Anaheim, Calif., assignor to Robertshaw Controls Company, Richmond, Va., a corporation of Delaware
Filed July 6, 1967, Ser. No. 651,570
Int. Cl. H01v 1/04
U.S. Cl. 136—217                10 Claims

ABSTRACT OF THE DISCLOSURE

A thermocouple which may be attached to any type of support bracket, has a mounting portion and a pair of adaptors thereon in spaced relation to each other with each adaptor having a resilient element cooperating with the mounting portion to enable initial slip-on positioning of the two adaptors which may be finally moved into clamping positions relative to the support bracket.

BACKGROUND OF THE INVENTION

Field of the invention

This invention relates to a thermocouple and in particular to such a universal thermocouple having a novel mounting arrangement for adjustably supporting the same in a selected oriented position relative to a pilot burner.

Description of the prior art

The prior art, as exemplified by U.S. Pats. No. 2,610,984 and No. 3,184,337, recognizes the desirability of properly orienting the thermocouple with respect to the flame issuing from the pilot burner and accomplishes this result by means of a unitary mounting bracket. The prior art structures have resulted in the manufacture of a wide variety of thermocouple-pilot mounting assemblies so that, when it is necessary to replace a thermocouple, only the same type of thermocouple by the same manufacturer may be used as a replacement. While making a service call for a defective thermocouple, the serviceman is required to carry a large inventory of replacement thermocouples. In addition, the usual location of the thermocouple adjacent the pilot burner in the burner box of furnace does not present suitable working area for tool manipulation by the serviceman in attaching and detaching the thermocouple.

SUMMARY OF THE INVENTION

It is, therefore, an object of the present invention to construct a universal thermocouple that may be utilized with any type of mounting bracket.

Another object of this invention is to provide a thermocouple with attachment adaptors that are frictionally slidable thereon to facilitate assembly without tools.

The simple construction of the thermocouple according to the present invention eliminates the problems of the prior art structures in that a serviceman need only carry a small number of thermocouples because they will fit any type of mounting brackets and in that no tools are needed to attach the thermocouple to the mounting bracket because the adaptors are slidable thereon by simple manual movements.

In practicing the present invention, a thermocouple is constructed to include a mounting portion, a pair of adaptors disposed on the mounting portion in spaced relation to each other, friction means carried by at least one of said adaptors and forming a unitary assembly therewith, and with the friction means defining an operative connection between the mounting portion and its corresponding adaptor for sliding the same on the mounting portion relative to the other adaptor thereon.

Other objects and advantages of the present invention will become apparent from the following description of a preferred embodiment taken in conjunction with the accompanying drawings.

BRIEF DESCRIPTION OF THE DRAWINGS

FIG. 1 is a side elevational view of a thermocouple-pilot assembly embodying the thermocouple of the present invention;

FIG. 2 is an enlarged elevational view of the thermocouple shown in FIG. 1 with parts shown in vertical section;

FIG. 3 is an exploded perspective view of a detail of FIG. 1;

FIG. 4 is a bottom plan view of the detail of FIG. 3 with a part removed; and

FIG. 5 is a bottom plan view showing the detail of FIG. 3 in assembled relationship.

DESCRIPTION OF THE PREFERRED EMBODIMENT

As is illustrated in FIG. 1, the present invention is shown in assembled relation with a thermocouple-pilot assembly including a flat L-shaped mounting bracket 10, one leg of which is suitably apertured for attachment to main burner apparatus (not shown); the other leg of bracket 10 is provided with a pair of spaced flanges 12 and 14 integrally formed with and extending transversely from opposite edges of such other leg. A pilot burner and hood 16 is secured to the spaced flanges 12 and 14 adjacent one end thereof by means of a coupling nut 18 and is supplied with a pilot flow of fuel by a conduit 19 as is well known in the art. The spaced flanges 12 and 14 are suitably bored adjacent their other end to define aligned apertures which receive a thermocouple, indicated generally at 20.

The thermocouple 20 has cable connector 22 on one end of a thermocouple tubing 24 for attachment to a suitable thermoelectric appliance (not shown). Adjacent its other end the thermocouple tubing 24 is provided with means for mounting it to the bracket 10. In the preferred embodiment of the present invention, such mounting means includes a portion 26 of the thermocouple and a pair of spaced adaptors thereon which cooperate with the thermocouple mounting portion 26 and the flanges of bracket 10.

As best illustrated in FIG. 2, the upper adaptor 30 includes a retainer washer 32 with a downwardly extending peripheral flange 34, friction means in the form of a spring clip 36 being generally C-shaped with a chordal terminus 38, and an adaptor body having an upper bore 40 terminating at an annular abutment 44 leading to a smaller, lower, concentric bore 46. The exterior of the adaptor body is step tapered commencing with an upper cylindrical wall 48 that terminates in an annular shoulder 50 directed inwardly to a truncated conical wall defining a tapered step 52 which is the largest in diameter of a series of tapered steps. An annular shoulder 54 extends between the step 52 and a truncated conical wall defining a tapered step 56 of intermediate diameter which terminates in an annular shoulder 58 directed inwardly to a truncated conical wall defining a tapered step 60 which is the smallest in diameter in the series.

As is shown in FIGS. 2 and 3, the lower adaptor 130 generally resembles the construction of the upper adaptor 30; accordingly, reference numerals with 100 added are utilized to identify those elements of lower adaptor 130 which are identical to those elements of upper adaptor 30 so they need not be described again. With respect to those elements of lower adaptor 130 which are not identical to those of upper adaptor 30, new reference numerals in the 100 series will be utilized. For example, the exterior lower cylindrical wall 148 terminates in an annular shoulder 149 directed outwardly to a larger cylindrical wall 151 which terminates in an annular shoulder 153 directed inwardly to a truncated conical wall defining a tapered step 155 that is the largest in diameter of a series of tapered steps. An annular shoulder 157 extends between the step 155 and a truncated conical wall defining a tapered step 159 of intermediate diameter which terminates in an annular shoulder 161 directed inwardly to a truncated conical wall defining a tapered step 163 which is the smallest in diameter of the series on the lower adaptor body.

Each adaptor 130 (and 30) is assembled as a unit by placing the spring clip 136 (and 36) in the larger bore 140 (and 40) to rest on the internal abutment 144 (and 44), as is illustrated in FIG. 4. The retainer washer 132 is then placed over the spring clip 136 and held therein by spaced tabs 147 punched in from the peripheral edge of the cylindrical wall 148, as is illustrated in FIG. 5; the upper adaptor 30 also has spaced tabs punched in to hold the retainer washer 32 in place.

In the following description of the operative relationship of the above thermocouple, it is to be understood that any other type of supporting bracket 10 may be used; e.g., only a single flange may be utilized and the opening need not be a circular aperture but may be merely a slot. The only requirement for the structure of the bracket is that it has some form of an edge or surface to cooperate with the thermocouple adaptors; thus, it is readily apparent that since such an edge or surface is found on every bracket regardless of the manufacture, the thermocouple is truly universal.

With the conventional arrangement of supporting bracket 10 in FIG. 1, the upper and lower flanges 12 and 14 have aligned apertures that are of different diameters. The thermocouple 20 of FIG. 2 is assembled on the bracket 10 by first removing the upper adaptor 30 and inserting the thermocouple end through the lower apertured flange 14 in an upward direction and thence through the upper apertured flange 12. Once the tip of the thermocouple is located so as to be in the flame which will issue from the pilot burner 16, the lower adaptor 130 is moved upward by sliding it along the mounting portion 26 until one of its annular shoulders 153, 157 or 161 abuts the undersurface of flange 14 and one of its tapered steps 155, 159 or 163 protrudes through the aperture in the lower flange 14. The upper adaptor 30 is now slipped onto the thermocouple and moved downward by sliding it along the mounting portion 26 until one of its annular shoulders 50, 54 or 58 abuts the upper surface of flange 12 and one of its tapered steps 52, 56 or 60 protrudes through the aperture in the upper flange 12.

The two adaptors 30 and 130 differ in respect to the diameters of their tapered steps so as to conform to various sizes of flange openings or slots on the various types of supporting brackets. Accordingly, the thermocouple tip may be properly oriented with respect to the pilot burner 16 and the adaptors 30 and 130 do not interfere with the other structure on the bracket 10, such as the hood and/or the fastener of the pilot burner 16.

In the above arrangement the bores 46 and 146 of the adaptors 30 and 130, respectively, have smooth walls and identical diameters slightly larger than the diameter of the thermocouple 20. Thus, the bores 46 and 146 permit easy sliding for the adaptors 30 and 130, respectively, on the thermocouple 20 and act as guide elements during such sliding movement and the moving force need only be large enough to overcome the friction force of the friction elements 36 and 136, respectively. Furthermore, the friction elements 36 and 136 may be integrally formed as parts of the adaptors 30 and 130, respectively, in which event the retainers 32 and 132 may be eliminated.

The particular structure of the mounting portion 26 may be varied according to the requirements of particular installations. While the mounting portion 26 of the thermocouple 20 may be a completely smooth cylindrical wall (as its tip end), in the preferred embodiment it is shown as comprising a threaded portion 26 whereby the chordal end 38 (138) of the friction clip 36 (136) is disposed in such threads. As is illustrated in FIG. 4, the circular part of the C-shaped resilient clip 136 abuts the inner wall defining the bore 140 while the chordal end 138 is disposed across a slight chord of the circle defined by the bore 146. Such an arrangement permits a press or slip-on positioning of the adaptors 30 and 130 with their clip ends 38 and 138 sliding over the crests of the screw threads 26 in the manner of flexing detents. Of course, final positioning may be accomplished by rotating the adaptors 30 and 130 whereby the tension on the spring clips 36 and 136, respectively, assists in making a snug fit with the screw threads 26 during final threading. Because of the tapered steps on the exterior of the adaptors 30 and 130, such final threading provides a vernier type adjustment to locked positions.

The spring clip 36 (and 136) is made of round stock, such as wire or the like, so that its rounded circumference permits easy flexing and sliding movement over the screw threads 26. Consequently, it is apparent that the rolled type threads 26 may be replaced with other types of threads; for instance, even where a square type of thread is used on the mounting portion 26, the rounded circumference of clip end 36 (and 136) will still permit a push or slip-on movement of the adaptor 30 (and 130) since it will slide over the crest of each thread.

The present invention has the additional advantage of quick and easy removal of the thermocouple from the supporting bracket 10 when replacement thereof is necessary. Even during removal, no tools are needed and the removal and subsequent reassembly can be accomplished by an unskilled worker.

Inasmuch as the preferred embodiment of the present invention is subject to many modifications, variations and changes in details, it is intended that all matter contained in the foregoing description or shown on the accompanying drawing shall be interpreted as illustrative and not in a limiting sense.

What is claimed is:

1. A universal thermocouple for use with a burner having a mounting bracket formed with aperture means, said thermocouple having an elongated generally cylindrical configuration and comprising:
   an externally threaded mounting portion that is received by the aperture means of said mounting bracket;
   adaptor means coaxially disposed on said mounting portion and engageable with said mounting bracket;
   friction means on said adaptor means defining a yieldable axially-slidable operative connection between said adaptor means and said mounting portion; and
   thread means on said adaptor means adjustably engaged with the threads of said mounting portion whereby said friction means is utilized to effect initial positioning of said thermocouple relative to said mounting bracket and the flame issuing from said burner and said thread means is utilized to effect final positioning of said thermocouple relative to said mounting bracket and the flame issuing from said burner.

2. A universal thermocouple as set forth in claim 1 wherein said friction means comprises a flexible detent element.

3. Apparatus as set forth in claim 1 wherein said friction means comprises a resilient clip having a part engaging said adaptor means and a part engaging said mounting portion.

4. A universal thermocouple as set forth in claim 1 wherein said adaptor means comprises a body member having an internal bore received by said mounting portion and a larger bore at one end of said body member, and a spring clip is seated in said larger bore, said spring clip having an arcuate section seated in said larger bore and a linear section protruding across an extension of said internal bore to engage said mounting portion.

5. A universal thermocouple for use with a burner having a mounting bracket formed with aperture means, said thermocouple having an elongated generally cylindrical configuration and comprising:
   an externally threaded mounting portion that is received by the aperture means of said mounting bracket;
   upper and lower adaptors coaxially disposed on said mounting portion in axially spaced relation to each other and engageable with said mounting bracket;
   friction means on each of said upper and lower adaptors defining a yieldable axially-slidable operative connection between each of said adaptors and said mounting portion; and
   thread means on said upper and lower adaptors adjustably engaged with the threads of said mounting portion whereby said friction means is utilized to effect initial positioning of said thermocouple relative to said mounting bracket and the flame issuing from said burner and said thread means is utilized to effect final positioning of said thermocouple relative to said mounting bracket and the flame issuing from said burner, 6. A universal thermocouple as set forth in claim 5 wherein said friction means comprises a flexible detent element.

7. Apparatus as set forth in claim 5 wherein said friction means comprises a resilient clip having a part engaging said adaptor means and a part engaging said mounting means.

8. A universal thermocouple as set forth in claim 5 wherein said upper and lower adaptors each comprise a body member having an internal bore received by said mounting portion and a larger bore at one end of said body member and a spring clip is seated in said larger bore, said spring clip having an arcuate section seated in said larger bore and a linear section protruding across an extension of said internal bore to engage said mounting portion.

9. A universal thermocouple as set forth in claim 5 wherein said upper and lower adaptors are tapered radially inwardly and axially towards the aperture means of said mounting bracket.

10. A universal thermocouple as recited in claim 5 wherein said upper and lower adaptors each comprise a body member having tapered steps on its exterior for selective engagement with the aperture means of said mounting bracket and having internal bore means receiving the mounting portion of said thermocouple.

References Cited

UNITED STATES PATENTS

| Re. 14,280 | 4/1917 | Bristol | 136—222 |
| 2,410,098 | 10/1946 | Muller | 136—235 |
| 2,480,557 | 8/1949 | Cummins | 136—221 |
| 3,290,178 | 12/1966 | Loveland | 136—242 |
| 3,294,592 | 12/1966 | Fish et al. | 136—235 X |

WINSTON A. DOUGLAS, Primary Examiner

M. J. ANDREWS, Assistant Examiner